W. K. HOWE.
ELECTRIC DYNAMO.
APPLICATION FILED APR. 28, 1913.

1,114,361.

Patented Oct. 20, 1914.

WITNESSES:
George T. Whitney
Sherman A. Benedict

INVENTOR.
Winthrop K. Howe,
BY
Lyman E. Dodge
ATTORNEY.

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

ELECTRIC DYNAMO.

1,114,361.  Specification of Letters Patent.  Patented Oct. 20, 1914.

Application filed April 28, 1913. Serial No. 764,190.

*To all whom it may concern:*

Be it known that I, WINTHROP K. HOWE, a citizen of the United States, and a resident of the city of Rochester, in the county of Monroe and State of New York, have invented a new and useful Electric Dynamo, of which the following is a specification.

This invention relates to an electric dynamo.

The object of this invention is a design of electric dynamo, such that the cost of manufacture will be reduced to a minimum.

Other objects and advantages of the invention will appear as the description of the invention progresses, and the novel features of the invention will be particularly pointed out in the appended claims.

Figure 1:
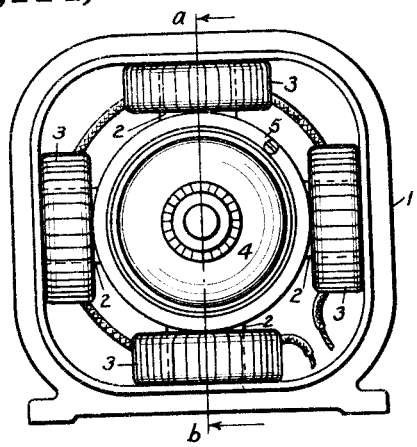
Figure 2:
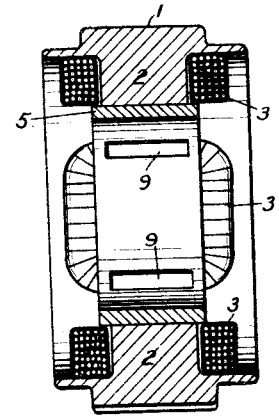
Figure 3:
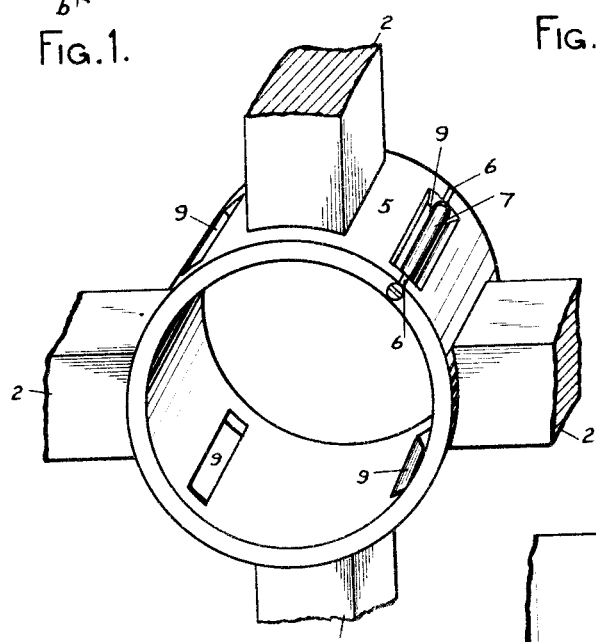
Figure 4:
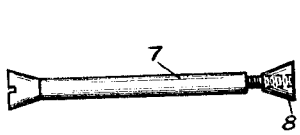
Figure 5:
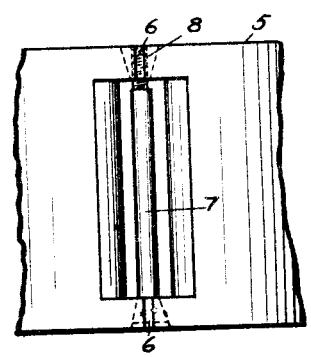

In describing the invention in detail, reference will be had to the accompanying drawings, wherein I have illustrated a preferred physical embodiment of my invention, and wherein like characters of reference designate corresponding parts throughout the several views and in which:

Figure 1, is a side elevation of a dynamo embodying my invention; Fig. 2, is a sectional elevation of the dynamo illustrated by Fig. 1 omitting the armature, on the line *a—b* looking in the direction of the arrows; Fig. 3, is a perspective view of the body forming the armature space and the poles of the dynamo as shown in Fig. 1; Fig. 4, is a detail view of an expanding means used in my invention; Fig. 5, is a fragmentary detail view of the body surrounding the armature space as shown in Fig. 1.

1, designates the field of magnetic material of a dynamo; 2, designates poles cast integrally therewith; 3, designates field coils placed on the poles 2; 4, designates an armature which may be of any well known and approved form.

Applicant forms the poles 2 integral with the body 1 and then by one machine operation dresses the outer ends of the poles 2 so as to form them as the arc of a circle. An annulus, which may be purchased in the open market, of magnetic material 5, split lengthwise as at 6, is then placed in position as shown in Fig. 3 bearing against the poles 2. This annulus is selected of such a size that it fits snugly between the poles. A threaded rod 7 is then put in position as best shown by Figs. 3 and 5, and a cone nut 8 is screwed onto its threaded end. The cone shaped head of the rod 7 and the cone nut 8, fit in cone shaped cavities on either side of the annulus 5, so that when the nut is tightened, the annulus 5 is slightly enlarged in diameter so that it then bears very firmly against the ends of the poles 2, so that it cannot move. As heretofore mentioned the annulus 5, before being expanded, fits quite tightly between the poles 2, so that the tightening of the rod 7 does not distort the annulus 5 to any appreciable extent so that its inner surface still remains practically a true circle.

The armature 4, is made the proper size so that it may rotate within the annulus 5 with the proper mechanical and electrical clearances.

The annulus 5, has cut-away portion as at 9, so as to prevent the free flow of magnetic flux from pole to pole and cause it to flow as it should through the magnetic material of which the armature 4 is composed.

The construction described is such that a fixed brush holder may be used to support the brushes because if they are not exactly at the neutral point, the bolt 7 may be loosened and the annulus 5 may then be rotated so that the center of the pole face will be so shifted that the brushes will be at the neutral point.

Applicant's construction is such that, a form wound coil may be used containing the minimum amount of wire; a minimum number of machine operations is required; and that which serves as the pole face may be rotated about the armature so that a fixed brush holder may be used.

Although I have particularly described the construction of one physical embodiment of my invention, and explained the operation and principle thereof; nevertheless, I desire to have it understood that the form selected is merely illustrative, but does not exhaust the possible physical embodiment of the idea of means underlying my invention.

What I claim as new and desire to secure by Letters Patent of the United States, is:

In a dynamo: a field magnet of magnetic material formed with polar projections; a form wound coil of insulated wire on each polar projection; a split annulus of magnetic material inserted between diametrically opposite polar projections for forming an armature space; said annulus formed with cone shaped cavities on either side, one-half of the cone shaped cavities being on one side of the division caused by splitting the annulus and the other half of the cavities being on the other side; a bolt formed with a threaded end and a cone shaped head fitting into one cavity, and a nut screwed on the threaded end of the bolt fitting into the other cavity, the said nut and bolt causing the annulus to expand and press firmly against the polar projections so as to be held firmly in position.

WINTHROP K. HOWE.

Witnesses:
LILLIAN L. PHILLIPS,
LORETTA M. SPIESS.